3,177,219
1-PHENYL-4-PYRIDYLETHYL-PIPERAZINES

Arnold Brossi, Verona, N.J., and Hans Bruderer, Riehen, Switzerland, assignors to Hoffmann-La Roche Inc., Nutley, N.J., a corporation of New Jersey
No Drawing. Original application Jan. 15, 1962, Ser. No. 166,367. Divided and this application Aug. 25, 1964, Ser. No. 392,045
Claims priority, application Switzerland, Jan. 20, 1961, 713/61; Apr. 10, 1961, 4,194/61; Oct. 11, 1961, 11,754/61
4 Claims. (Cl. 260—268)

This application is a division of copending application Serial No. 166,367, filed January 15, 1962.

The instant invention relates to novel piperazine compounds and a method for their production, which method is characterized in that a 1-phenyl-piperazine, wherein the phenyl moiety can be unsubstituted or substituted by a radical selected from the group consisting of alkyl, alkoxy, hydroxy, nitro and halo, is condensed with a vinyl substituted pyridine, quinoline or isoquinoline, which can be further nuclearly substituted, and the reaction product of this condensation is, if desired, converted into a salt.

The alkyl group by which the phenyl radical of the above formula can be substituted is preferably a straight or branched chain alkyl group of 1–6 carbon atoms. Alkoxy groups, by which the phenyl radical can be substituted, are preferably lower alkoxy groups containing both straight and branched chain lower alkyl moieties. As exemplary there may be mentioned ethoxy, methoxy, propoxy and butoxy. Halo comprehends all four halogens. As stataed above, the vinyl heterocyclic compounds can be nuclearly substituted. Among the nuclear substituents comprehended by the invention are, for example, alkyl groups such as lower alkyl groups, for example methyl and ethyl; alkoxy groups such as lower alkoxy groups, for example methoxy and ethoxy, or alkylenedioxy groups such as lower alkylenedioxy groups, for example methylenedioxy and ethylenedoxy..

Suitable vinyl starting materials for the above condensation are, for example, 2-vinyl-pyridine, 4-vinyl-pyridine, 2-vinyl-quinoline, 1-vinyl-isoquinoline or 1-vinyl-6,7-dimethoxy-isoquinoline.

Preferably the condensation of the invention is conducted in a suitable organic solvent, for example, in an alcohol, such as a lower alkanol, for example methanol or ethanol. It is suitably conducted in the presence of an acid catalyst, for example acetic acid. A preferred embodiment of the condensation of the invention consists in dissolving the reaction components in equimolar proportions in ethanol, and in then refluxing them for several hours in the presence of a catalytic amount of acetic acid.

The piperazine compounds of the invention, wherein the phenyl radical bears a hydroxyl group, can also be prepared from the corresponding alkoxy-substituted condensation products via hydrolysis. This can be effected, for example, via treatment of the alkoxy-substituted condensation product with aqueous hydrogen bromide solution at the boil.

Condensation products wherein the phenyl radical bears a nitro group can be reduced to the corresponding amino compounds by an additional reaction step. Exemplary of the methods of effecting this reduction is treatment with hydrogen in the presence of a metallic catalyst, for example Raney nickel, palladium-carbon, or the like.

According to a further varient of the invention the so-obtained primary-amino substituted phenyl-piperazine compounds can be converted into the corresponding secondary or tertiary amino compounds. The primary amino group can, for example, be mono- or di-alkylated, preferably by lower alkyl groups. The alkylation can be effected by methods known per se. For example, the dimethylamino derivative can be prepared via treatment of the primary amino compound with formaldehyde/formic acid. Also suitable as alkylating agents are alkylhalides and dialkylsulfates. Another embodiment comprises first acylating the primary amino group, for example subjecting it to acetylation, and then, afterwards, reducing the acylamino group with a suitable reducing agent such as lithium aluminum hydride, to obtain the corresponding mono-alkyl derivative. Such monoalkylated derivatives can themselves be converted into dialkyl amino derivatives.

The process of the instant invention thus also comprises the preparation of phenyl-piperazines which in the phenyl radical are substituted by primary, secondary (for example alkylamino) or tertiary (for example dialkylamino) amino groups.

As is apparent from the above, the novel products of this invention are of the formula

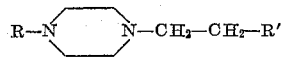

wherein R represents a phenyl radical which can be unsubstituted or substituted by a radical selected from the group consisting of alkyl, alkoxy, hydroxy, nitro, halo, amino, acylamino, alkylamino and dialkylamino, and R' represents a radical selected from the group consisting of pyridine, quinoline and isoquinoline, which can, if desired, be further nuclearly substituted preferably by groups such as alkyl, alkoxy and alkylenedioxy.

The piperazine compounds obtained by the condensation of this invention are strong bases which for the most part are easily crystallized. Moreover, these compounds yield with the customary mineral acids such as hydrochloric acid, sulfuric acid, hydrobromic acid, or the like, or with the customary organic acids such as citric acid, tartaric acid, or the like, crystalline acid addition salts which are easily soluble in water. Since these new compounds contain several basic centers they can form acid salts with one or several moles of a hydrohalic or other acid. When all the basic centers are protonized the resulting salts give strongly acidic aqueous solutions. Such salts are not completely suitable as therapeutic agents. Preferred for the preparation of therapeutic forms therefore are the free bases or such salts with pharmaceutically acceptable acids wherein at the most two of the basic centers are protonized, such as, for example, the mono- or di-hydrochloride. The piperazine compounds of the above formula thus form pharmaceutically acceptable acid addition salts with conventional pharmaceutically acceptable acids, such as those above-mentioned.

The novel piperazine compounds of the invention and their salts possess tranquilizing and appetite depressant properties and also exert a marked influence on blood pressure. The piperazine compounds containing a nitro substituent on the phenyl radical are hypertensive, while the remainder of the novel piperazine compounds are hypotensive. The novel compounds of the invention can be administered in conventional pharmaceutical forms such as, for example, in mixture with a conventional enteral or parenteral pharmaceutical organic or inorganic inert carrier material such as water, gelatin, lactose, starch, magnesium stearate, talc, vegetable oils, polyalkylene glycols, vaseline, or the like. The pharmaceutical preparations can be in conventional solid forms such as for example, tablets, dragees, suppositories, capsules, or the like, or in conventional liquid forms such as lozenges, suspensions, emulsions, or the like. If desired, they can be sterilized or submitted to conventional pharmaceutical processes and can contain, if desired, conventional pharmaceutical excipients such as preservatives, stabilizing agents, wetting agents, emulsifying agents, buffers or salts to effect isotonicity. They can also, if desired, contain other therapeutically active materials.

The following examples are illustrative but not limitative of the above described invention. All temperatures are stated in degress centigrade.

*Example 1*

16.2 g. of 1-phenyl-piperazine were dissolved in 50 ml. of ethanol, 4.0 g. of acetic acid and 11.0 g. of 4-vinyl pyridine were then added thereto and the resulting mixture refluxed for 24 hours. After the reaction mixture was concentrated in vacuo the residue was combined with 3 N sodium hydroxide and, after being permitted to stand, filtered. The filtrate was then dried over phosphorus pentoxide and recrystallized twice from isopropyl ether to yield 1-phenyl-4-(β-4-pyridyl-ethyl)-piperazine melting at 86°. The base was then dissolved in acetone and alcoholic hydrochloric acid added thereto until the solution tested acid with Congo red. The so-obtained trihydrochloride was then recrystallized from alcohol-ether and melted at 236–238°. Dissolution of the free base in the necessary amount of aqueous hydrochloric acid, followed by concentration of the solution, and heating the residue with acetone yielded the dihydrochloride as crystals which after recrystallization from alcohol-ether melted at 228–230° (with previous sintering). A 1% aqueous solution of the dihydrochloride had a pH-value of 5.

Via the above procedure there were prepared, by condensation of phenyl radical substituted 1-phenyl-piperazines with 4-vinyl-pyridines, the following piperazine compounds:

|  | Melting Point | |
|---|---|---|
|  | Base, degrees | Dihydrochloride |
| 1-(4-chlorophenyl)-4-(β-4-pyridyl-ethyl)-piperazine. | 114–115 | 234–236°. |
| 1-(3-chlorophenyl)-4-(β-4-pyridyl-ethyl)-piperazine. | 55 | 210–212°. |
| 1-(2-chlorophenyl)-4-(β-4-pyridyl-ethyl)-piperazine. | 65–66 | 230–232°. |
| 1-(4-methylphenyl)-4-(β-4-pyridyl-ethyl)-piperazine. | 92 | 217–219°. |
| 1-(4-methoxyphenyl)-4-(β-4-pyridyl-ethyl)-piperazine. | 109 | 215°. |
| 1-(2-methoxyphenyl)-4-(β-4-pyridyl-ethyl)-piperazine. | 92–93 | 132–134° (hydrate.) |
| 1-(4-hydroxyphenyl)-4-(β-4-pyridyl-ethyl)-piperazine. | 183 | 90–92° (hydrate). |
| 1-(4-nitrophenyl)-4-(β-4-pyridyl-ethyl)-piperazine. | 149.5 | 250° (dec.). |
| 1-(2-nitrophenyl)-4-(β-4-pyridyl-ethyl)-piperazine. | ---------- | 165–167° (monohydrochloride). |

1-(4-hydroxyphenyl)-4-(β-4-pyridyl-ethyl)-piperazine was prepared from 1-(4-methoxyphenyl)-4-(β-4-pyridyl-ethyl)-piperazine via treatment of the latter with a 48% aqueous hydrogen bromide solution while heating at the boil for 1 hour, following which the reaction mixture was concentrated, rendered alkaline and filtered. The residue was then dried and crystallized from ethyl acetate yielding the product.

*Example 2*

5 g. of 1-phenyl-piperazine and 3.5 g. of 2-vinyl-pyridine were dissolved in 20 ml. of ethanol and 2 g. of acetic acid added thereto, whereupon the resulting mixture was heated for 6 hours, concentrated and rendered alkaline with sodium hydroxide, yielding a basic, chloroform-soluble residue which was dissolved in isopropyl ether. Concentration yielded crystals of 1-phenyl-4-(β-2-pyridyl-ethyl)-piperazine melting at 61°; its trihydrochloride, which was obtained according to the procedure described in Example 1, after recrystallization from alcohol-ether, melted at 196–198°. Similarly, the dihydrochloride melted at 187–188°.

Via the above procedure there were prepared, by condensation of phenyl radical substituted 1-phenyl-piperazines with 2-vinyl-pyridines, the following piperazine compounds:

|  | Melting Point | |
|---|---|---|
|  | Base, degrees | Dihydrochloride |
| 1-(4-Chlorophenyl)-4-(β-2-pyridyl-ethyl)-piperazine. | 114–115 | 133–135° (hydrate). |
| 1-(3-Chlorophenyl)-4-(β-2-pyridyl-ethyl)-piperazine. | ---------- | 210–212°. |
| 1-(2-Chlorophenyl)-4-(β-2-pyridyl-ethyl)-piperazine. | ---------- | 187–189°. |
| 1-(4-Methylphenyl)-4-(β-2-pyridyl-ethyl)-piperazine. | 79–80 | 164–166°. |
| 1-(4-Methoxyphenyl)-4-(β-2-pyridyl-ethyl)-piperazine. | 106 |  |
| 1-(2-Methoxyphenyl)-4-(β-2-pyridyl-ethyl)-piperazine. | 51–52 | 190–192°. |
| 1-(2-Hydroxyphenyl)-4-(β-2-pyridyl-ethyl)-piperazine. | ---------- | 196° (trihydrobromide). |
| 1-(4-nitrobenzyl)-4-(β-2-pyridyl-ethyl)-piperazine. | 156–157 | 203°. |

1-(2-hydroxyphenyl)-4-(β-2-pyridyl-ethyl)-piperazine was prepared from the corresponding methoxy compound via the procedure described in Example 1.

*Example 3*

15.2 g. of 1-(4-nitrophenyl)-4-(β-4-pyridyl-ethyl)-piperazine were dissolved in 500 ml. of ethanol and, following addition of 2.5 g. of 5% palladium-carbon, hydrogenated at atmospheric pressure and room temperature. After absorption of the required amount of hydrogen, the solution was separated from the catalyst and concentrated. The residue was dissolved in a small amount of alcohol and mixed with an excess of ethanolic hydrochloric acid. Ether was then added until turbidity, whereupon 1-(4-aminophenyl)-4-(β-4-pyridyl-ethyl)-piperazine spontaneously precipitated in the form of its trihydrochloride. It was recrystallized from 95% alcohol solution and with previous sintering melted at about 270° (dec.).

*Example 4*

14.8 g. of 1-(4-aminophenyl)-4-(β-4-pyridyl-ethyl)-piperazine was dissolved in 50 ml. of pyridine and mixed with 50 ml. of acetic acid anhydride. After a short time a reddish precipitate settled out, which after standing one hour was separated and then twice recrystallized from methanol-ether yielding 1-(4-acetylaminophenyl)-4-(β-4-pyridyl-ethyl)-piperazine as slightly violet crystals melting at 213°.

14 g. of the above obtained N-acetyl compound was dissolved in 250 ml. of absolute tetrahydrofuran and then dropped into a suspension of 5 g. of lithium aluminium hydride in 50 ml. of ether. After the reaction mixture had been maintained for 2 hours at 60° on a oil bath it was cooled and the resulting complex decomposed by addition of 10 ml. of concentrated sodium hydroxide. The solution was then dried over potassium carbonate and concentrated. Upon sprinkling the so-obtained brown residue with acetone, the product crystallized. After twice being recrystallized from methanol-ether, 1-(4-ethylaminophenyl)-4-(β-4-pyridyl-ethyl)-piperazine was obtained as yellowish crystals melting at 150–151°.

We claim:
1. A compound selected from the group consisting of compounds of the formula

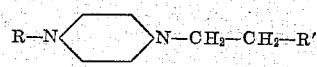

wherein R is nitrophenyl and R' is pyridine, and acid salts thereof.
2. 1-(4-nitrophenyl)-4-(β-4-pyridyl-ethyl)-piperazine.
3. 1-(4-nitrophenyl)-4-(β-2-pyridyl-ethyl)-piperazine.
4. 1-(2-nitrophenyl)-4-(β-4-pyridyl-ethyl)-piperazine.

No references cited.

IRVING MARCUS, *Primary Examiner.*